(12) United States Patent
Ruml et al.

(10) Patent No.: US 8,145,335 B2
(45) Date of Patent: Mar. 27, 2012

(54) EXCEPTION HANDLING

(75) Inventors: Wheeler Ruml, Palo Alto, CA (US); Minh Binh Do, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1345 days.

(21) Appl. No.: 11/612,908

(22) Filed: Dec. 19, 2006

(65) Prior Publication Data

US 2008/0148257 A1    Jun. 19, 2008

(51) Int. Cl.
*G06F 19/00* (2011.01)
(52) U.S. Cl. ......... 700/105; 700/100; 700/103; 700/108
(58) Field of Classification Search ................. 700/103, 700/105, 108, 100, 121
See application file for complete search history.

(56) References Cited

U.S. PATENT DOCUMENTS

| | | |
|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,008,713 A | 4/1991 | Ozawa et al. |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,710,968 A | 1/1998 | Clark et al. |
| 5,778,377 A | 7/1998 | Marlin et al. |
| 5,884,910 A | 3/1999 | Mandel |
| 5,995,721 A | 11/1999 | Rourke et al. |
| 6,059,284 A | 5/2000 | Wolf et al. |
| 6,125,248 A | 9/2000 | Moser |
| 6,241,242 B1 | 6/2001 | Munro |
| 6,297,886 B1 | 10/2001 | Cornell |
| 6,341,773 B1 | 1/2002 | Aprato et al. |
| 6,384,918 B1 | 5/2002 | Hubble, III et al. |
| 6,450,711 B1 | 9/2002 | Conrow |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Kakali Chaki
*Assistant Examiner* — Sheela S Rao
(74) *Attorney, Agent, or Firm* — Fay Sharpe LLP

(57) ABSTRACT

A system that re-plans jobs based at least in part on user preferences in response to system component errors includes an exception handler that receives an exception from one of a plurality of components executing a plan to process a job. The system further includes a planner that creates a new plan for the job based at least in part on a model-based planning technique and at least one user preference.

21 Claims, 5 Drawing Sheets

U.S. PATENT DOCUMENTS

| | | |
|---|---|---|
| 6,476,376 B1 | 11/2002 | Biegelsen et al. |
| 6,476,923 B1 | 11/2002 | Cornell |
| 6,493,098 B1 | 12/2002 | Cornell |
| 6,537,910 B1 | 3/2003 | Burke et al. |
| 6,550,762 B2 | 4/2003 | Stoll |
| 6,554,276 B2 | 4/2003 | Jackson et al. |
| 6,577,925 B1* | 6/2003 | Fromherz ............... 700/255 |
| 6,607,320 B2 | 8/2003 | Bobrow et al. |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon et al. |
| 6,633,382 B2 | 10/2003 | Hubble, III et al. |
| 6,639,669 B2 | 10/2003 | Hubble, III et al. |
| 6,819,906 B1 | 11/2004 | Herrmann et al. |
| 6,925,283 B1 | 8/2005 | Mandel et al. |
| 6,959,165 B2 | 10/2005 | Mandel et al. |
| 6,973,286 B2 | 12/2005 | Mandel et al. |
| 7,024,152 B2 | 4/2006 | Lofthus et al. |
| 7,123,873 B2 | 10/2006 | deJong et al. |
| 7,139,629 B2* | 11/2006 | Fromherz et al. ........... 700/100 |
| 7,380,166 B2* | 5/2008 | Thatte et al. ............... 714/20 |
| 7,620,470 B1* | 11/2009 | Hickey et al. ............. 700/100 |
| 7,689,312 B2* | 3/2010 | Goings et al. ............. 700/110 |
| 7,739,135 B2* | 6/2010 | Shukla et al. ............... 705/7 |
| 2002/0078012 A1 | 6/2002 | Ryan et al. |
| 2002/0103559 A1 | 8/2002 | Gartstein |
| 2003/0077095 A1 | 4/2003 | Conrow |
| 2004/0085561 A1 | 5/2004 | Fromherz |
| 2004/0085562 A1 | 5/2004 | Fromherz |
| 2004/0088207 A1 | 5/2004 | Fromherz |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0247365 A1 | 12/2004 | Lofthus et al. |
| 2005/0125275 A1* | 6/2005 | Wright et al. ............... 705/9 |
| 2006/0033771 A1 | 2/2006 | Lofthus |
| 2006/0066885 A1 | 3/2006 | Anderson et al. |
| 2006/0067756 A1 | 3/2006 | Anderson et al. |
| 2006/0067757 A1 | 3/2006 | Anderson et al. |
| 2006/0106477 A1* | 5/2006 | Miyashita ............... 700/103 |
| 2006/0114313 A1 | 6/2006 | Moore |
| 2006/0114497 A1 | 6/2006 | Anderson et al. |
| 2006/0115284 A1 | 6/2006 | Grace et al. |
| 2006/0115287 A1 | 6/2006 | Roof |
| 2006/0115288 A1 | 6/2006 | Roof |
| 2006/0132815 A1 | 6/2006 | Lofthus et al. |
| 2006/0176336 A1 | 8/2006 | Moore et al. |
| 2006/0197966 A1 | 9/2006 | Viturro et al. |
| 2006/0209101 A1 | 9/2006 | Mizes |
| 2006/0214359 A1 | 9/2006 | Clark |
| 2006/0214364 A1 | 9/2006 | Clark et al. |
| 2006/0215240 A1 | 9/2006 | Mongeon |
| 2006/0221159 A1 | 10/2006 | Moore et al. |
| 2006/0221362 A1 | 10/2006 | Julien et al. |
| 2006/0222378 A1 | 10/2006 | Julien et al. |
| 2006/0222384 A1 | 10/2006 | Moore et al. |
| 2006/0222393 A1 | 10/2006 | de Jong et al. |
| 2006/0227350 A1 | 10/2006 | Crawford et al. |
| 2006/0230201 A1 | 10/2006 | Fromherz et al. |
| 2006/0230403 A1 | 10/2006 | Crawford et al. |
| 2006/0233569 A1 | 10/2006 | Furst et al. |
| 2006/0235547 A1 | 10/2006 | Hindi et al. |
| 2006/0238778 A1 | 10/2006 | Mongeon et al. |
| 2006/0244980 A1 | 11/2006 | Grace |
| 2006/0250636 A1 | 11/2006 | Richards |
| 2006/0259341 A1* | 11/2006 | Fung et al. ............... 705/9 |

OTHER PUBLICATIONS

Desmond Fretz, "Cluster Printing Solution Announced", Today at Xerox (TAX), No. 1129, Aug. 3, 2001.

* cited by examiner

EXCEPTION HANDLING

BACKGROUND

The following relates to machine control planning. In particular, it is directed towards exception handling. More particularly, it is directed towards exceptions handling using flexible planning based at least in part user preferences.

Model-based planning is used for creating machine control plans. It is based on a notion that each component of the system can send a model of its behavior to a central planner or controller. The controller interprets the models to determine the capabilities and constraints of the system components. Subsequently, upon receiving one or more jobs to process, the controller generates a plan to process the one or more jobs based on the components' capabilities and capability constraints described within each of the component models. The plan may then be confirmed by each component of the system to ensure that each component can execute its portion of the plan. With model-based planning, plans are often built based on the assumption that all components will work as expected. Thus, model-based planning is often used to create plans only for normal behavior and is not involved in recovering from failures or exceptions (e.g., associated with one or more malfunctioning components/modules of a system, etc.) in the execution of these plans. Unfortunately, this assumption is often erroneous.

In one instance, conventional systems handle such exceptions associated with such plans by bringing the machine, apparatus, process, etc. to a safe state (e.g., stop, idled, off, etc.) and then trying to recover from the safe state. With some high-speed systems, gracefully halting a running system may be difficult or even impossible. In addition, frequent halting the system for error recovery (e.g., with every component failure) may lead a user to believe that the system is unreliable or defective. In another instance, a set of pre-defined rules are used to determine an alternative plan, for example, without invoking the planner. However, creating a set of rules for all possible exceptions may be time-consuming, error-prone, and/or not possible. Moreover, with systems in which the configuration is only known at boot-up and can be updated on-line, a set of pre-defined rules may become invalid or lead to inefficient handling of exceptions.

It may be possible to recover from an exception without operator intervention by using simple recovery procedures such as purging jobs, restarting the system, employing pre-determined rules, etc., and then completing the uncompleted portions of the current job. This approach may be unsatisfactory for systems with parallel modules or a potentially large number of work units in process. With different parts of a job distributed among multiple modules, these simple procedures may lead to time delays, lost processing time, inconsistencies in the system state, lost costly materials (purged jobs), and/or unexpected component/module interactions.

CROSS REFERENCE TO RELATED PATENTS AND APPLICATIONS

The following applications, the disclosures of each being totally incorporated herein by reference are mentioned:

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 11/069,020, filed Feb. 28, 2004, entitled "PRINTING SYSTEMS," by Robert M. Lofthus, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/359,065, filed Feb. 22, 2005, entitled "MULTI-MARKING ENGINE PRINTING PLATFORM", by Martin E. Banton;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.; and U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.

BRIEF DESCRIPTION

In one aspect, a system that re-plans jobs based at least in part on user preferences in response to system component errors is illustrated. The system includes an exception handler that receives an exception from one of a plurality of components executing a plan to process a job. The system further includes a, planner/replanner that creates a new plan for the job based at least in part on a model-based planning technique and at least one user preference.

DETAILED DESCRIPTION

The systems and/or methods described herein provide model-based planning for systems with modular components. Unlike conventional systems and/or method, exception handling is performed on-line and/or off-line without predetermined rules for each possible exception. Although, such rules can be used to facilitate the exception handling described herein. In addition, various exception handling approaches and/or strategies are contemplated. These approaches and/or strategies can be based on trade-offs between saving resources (e.g., input, output, etc.), exception handling time/effort, and/or on user preferences, unlike conventional systems.

Figure 1:
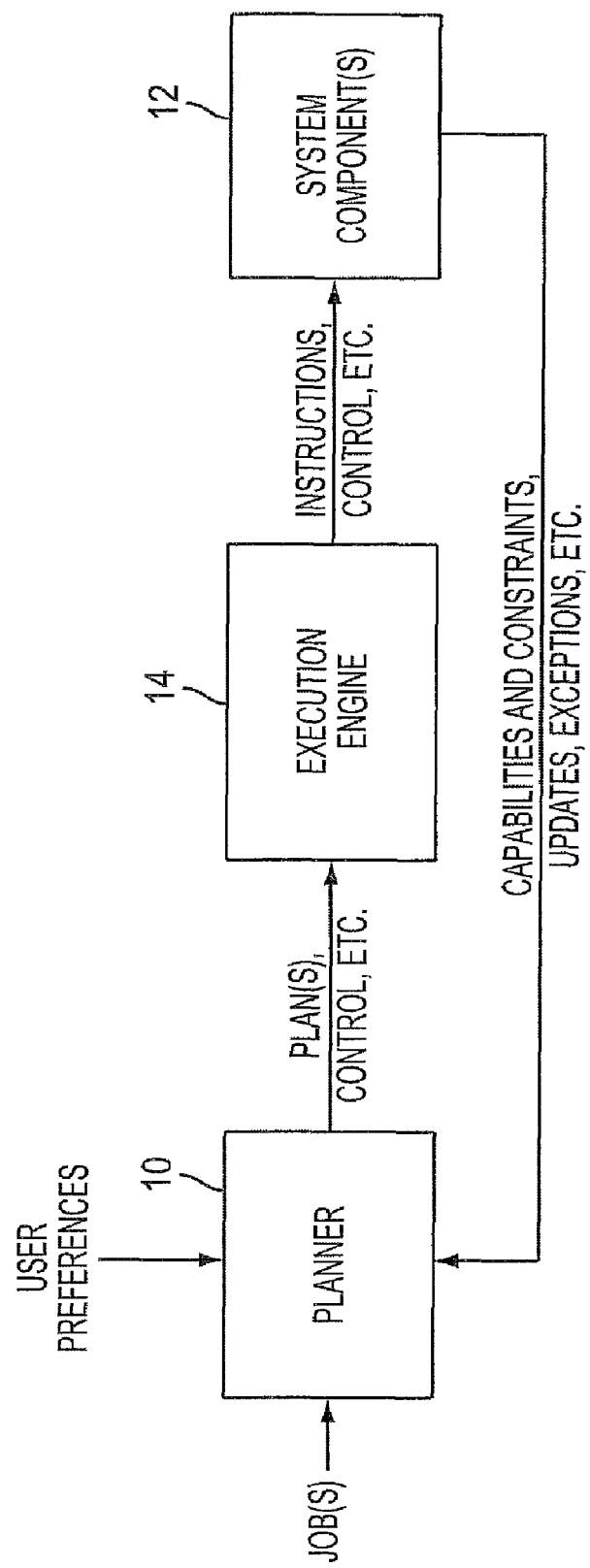
FIG. 1 illustrates a system with a planner that generates plans for processing jobs and that provides exception handling based at least on user preferences.

With reference to FIG. 1, a system with a planner 10 that generates one or more plans for processing one or more jobs with one or more components 12 of the system is illustrated. The system is able to manipulate one or more batches of jobs (e.g., each with a description of work to be performed by the system), wherein each batch may include one or more jobs. The jobs within a batch(s) may follow a certain or random order. The planner 10 may have to handle multiple batches of jobs at substantially the same time. This can be achieved by directing elements in different batches to separate output locations following the job ordering in each batch.

The planner 10 also provides exception handling (e.g., re-planning) to recover from errors associated with the execution of a plan by the one or more components 12. Such exception handling provides a framework for generating a new plan in an online and/or offline planning context when a failure or exception occurs during plan execution. The framework takes into account user preferences to find a suitable replacement strategy, which can be based on quickly solving the problem, saving as many unfinished products as possible, some combination thereof, and/or other criteria. An example of a suitable application is online re-planning for a tightly integrated high-speed parallel printing platform to re-route in-flight sheets due to paper-jams and/or other system and/or component failure(s).

The foregoing allows the system to appear "self-healing," requires less user-intervention, and increases the perceived reliability of the system controlled by the planner 10. The exception handling also enables the system to continue running instead of bringing it to a complete and/or sudden stop during re-planning process, which can be very hard to do for a complex system running at high-speed like tightly integrated printing systems. System life can also be increased by not allowing the system to follow abnormal mechanisms when an exception occurs. Further, the exception handling approaches described herein mitigates having to determine rules for all possible exceptions and provides different strategies with different levels of trade-off between exception handling time/efforts and the saving of the unfinished products. The user can provide his preferred exception handling approach up-front. The user can also indirectly provide his preferences using a general objective function and the system model that is relevant to the objective function (e.g. the objective function of minimizing operation cost in money and the system model containing information about all relevant costs such as computation cost, module's wear and tear cost, machine health maintaining cost etc). The planner 10 can also learn from a cost-model without a specific objective function (e.g. if the user needs to pay a lot for a given product, then saving media is likely to be more important than time/effort in handling exceptions, if the user is on a tight-deadline, then saving processing time is more important) or past user's behaviors in selecting the preferred exception handling approaches. The framework is flexible and can employ different search and planning algorithms to come up with the new plans. Thus, if planning speed is important, it can employ algorithms that find new plans fast; if machine health or cost is more important, it can use algorithms that not optimal on time but take a minimal use of the expensive modules.

The system can be a machine, an apparatus, a process, a print platform, or the like. The one or more components 12 can be and/or include modular hardware. Each of the components 12 can be associated with one or more capabilities that can be used to process one or more jobs, and each of the one or more capabilities can be associated with one or more constraints. In one instance, the capabilities and constraints thereon for a particular component 12 are described within a model corresponding to that component. Such model may be stored with its corresponding component 12 and/or elsewhere (local or remote). The model can also be provided to the planner 10 and/or made accessible to the planner 10 in order to apprise the planner 10 of the capabilities and the constraints on these capabilities. This can be achieved via wire and/or wireless approaches. Moreover, the model can be dynamically updated as the capabilities and/or constraints of the components 12 change, and the planner 10 can be provided access to and/or notified about the updated capabilities and/or constraints. This can include whether a component of the system can execute a capability under a corresponding constraint at a given time if requested to by the planner 10.

By way of non-limiting example, if the system were a multifunctional printing platform, the components 12 could include a paper feeder, a marking engine, a fuser, etc. Such fuser may be capable of fusing images on print medium, and the fusing capability may be temperature and/or toner constrained. Each of these components (e.g., the paper feeder, a marking engine, a fuser, etc.) may be associated with a model describing its capabilities and constraints and may provide the planner 10 with access to the description. For example, the model associated with the fuser may describe the fusing capabilities and temperature and toner constraints. Other non-limiting examples include an analysis system with components such as a preparation module, heating module, mixing module, analysis module, transport robot, etc., a manufacturing system with components such as a machining module, assembling module, testing module, transport robot, packaging module, etc., a packaging system with components such as a bottle filling module, a labeling module, as well as a logistic system, a routing system, a process, among others.

Upon receiving one or more jobs to process, the planner 10 creates one or more plans for processing the one or more jobs. The plans can include instructions and/or control signals for serially and/or concurrently processing the one or more jobs with the one or more components 12. The planner 10 creates such plans based on the capabilities and constraints of each of the components 12 (e.g., as determined from the component models) and a state of the system. Using such information, the plans are created to satisfy the goals of each job. The plans are conveyed to an execution engine 14, which executes the plans with one or more of the one or more components 12.

When one or more of the components 12 and/or an associated process malfunctions (e.g., abnormally performs, ceases to operate, executes outside of acceptable tolerances, etc.), the corresponding component 12 and/or other component (e.g., a controller) may throw an exception. Additionally or alternatively, the planner 10 may learn of such exception through monitoring each of the components 12 for errors.

In response, the planner 10 creates one or more new plans to process the one or more jobs. Such re-planning may include determining a plan for in-flight jobs (e.g., jobs currently being executed) and/or jobs waiting to be launched according to real-time constraints and relations within a "broken," partially processed plan. The planner 10 may achieve this through various algorithms that facilitate recovery. For instance, the planner 10, when an exception occurs, may cancel all plans that have not started by the execution engine. Then, depending on one or more preferences of a user, the planner 10 can generate a new plan for already launched portions of a plan. The original plan can be forward simulated for an amount of time that depends on the number of plans that need to be re-built and the expected computational speed of the planner, which in turn may depend on the algorithm for a selected preferred strategy in handling exceptions.

The planner 10 then creates new plans starting from the new locations for the new goals using a suitable algorithm (e.g., a chained best first search algorithm). The new plans are then sent to the execution engine 14 to replace the previous plans. Similarly, the execution engine 14 executes these plans with one or more of the one or more components 12. If another one of the components 12 and/or associated processes malfunctions, the foregoing exception handling and error recovery can be performed, and another set of new plans can be created and sent to the execution engine 14.

In an alternative embodiment, if the system is linear, the number of possible exception is low, and the number of possible outputs when an exception can occur is low, then a set of pre-determined rules for each exception can be generated and refined over. These rules can be used to facilitate the herein described exception handling technique. Another approach would be to guide the exception handling process with the general re-planning framework discussed herein, but with help from domain-control knowledge.

Figure 2:
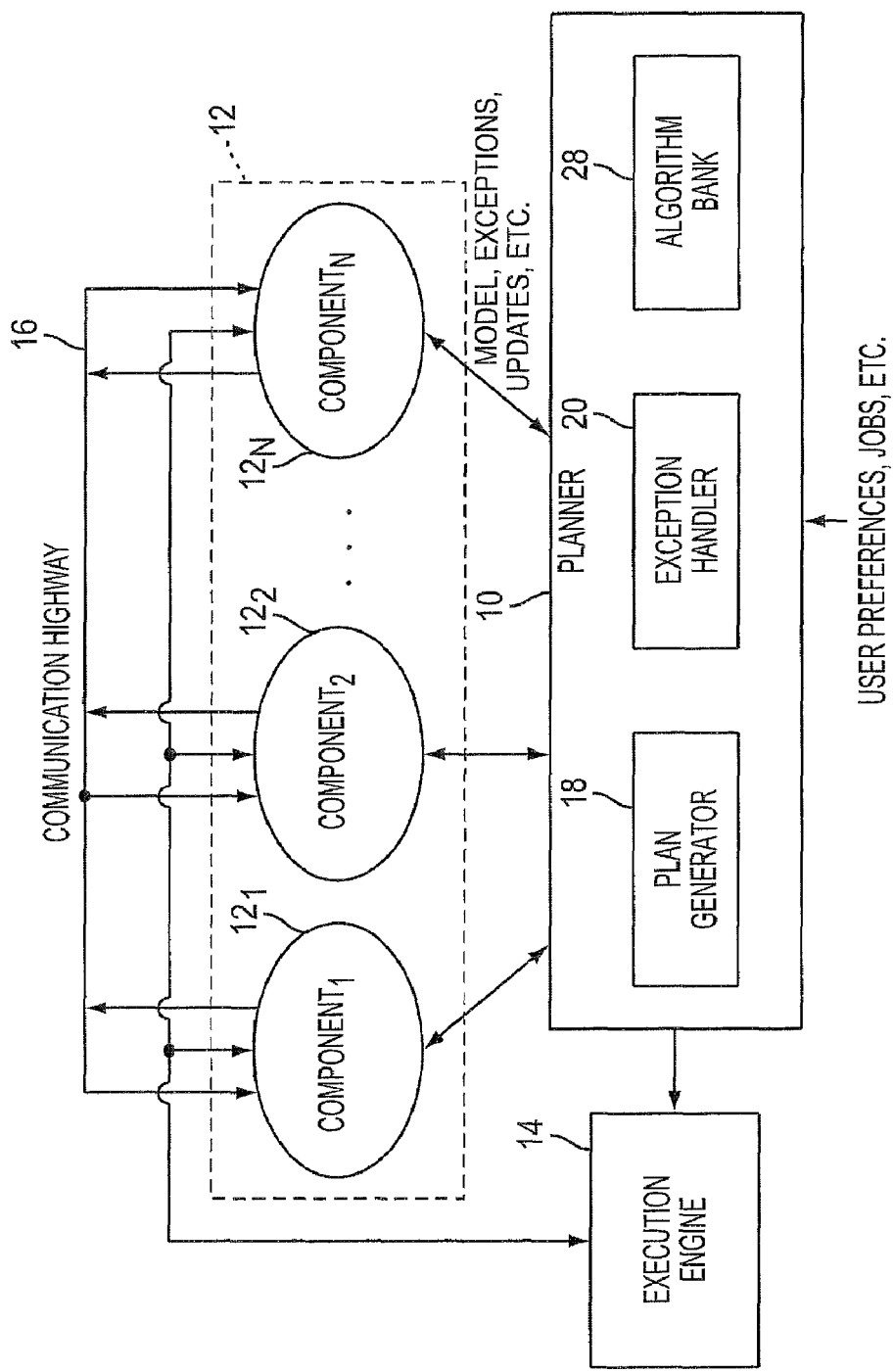
FIG. 2 illustrates the planner having a plan generator, an exception handler, and an algorithm bank that stores algorithms used to facilitates creating new plans along with the user preferences.

In FIG. 2, the one or more components 12 are depicted as including N components $12_1, 12_2, \ldots, 12_N$, wherein N is an integer equal to or greater than one. Each of the components $12_1, 12_2, \ldots, 12_N$ may be associated with a unique model that provides a description of its capabilities and constraints, and the model and/or the capabilities and constraints can be provided and/or made accessible to the planner 10. In an alternative embodiment, a single model can be used to describe the capabilities and constraints of each of the components 12 and/or individual models can be aggregated. Likewise, a single and/or aggregated model can be provided and/or made accessible to the planner 10.

Each of the components $12_1, 12_2, \ldots, 12_N$ can interact (uni-directionally or bi-directionally) with a communication highway 16. Using the communication highway 16, execution of one or more plans may be performed by one or more of the components 12. For example, a plan may be executed by a single one of the components by looping through the communication highway 16. In another example, the plan can include cycling a job within a particular one of the components 12 (e.g., the component $12_1$) before moving to a next component 12 (e.g., the component $12_2$). Alternatively, the plan may include cycling a job amongst a plurality of components 12 (e.g., the components $12_1$ and $12_N$) before passing it to another component (e.g., the component $12_2$). It is to be appreciated that these examples are provided for illustrative purposes and are not limiting. In addition, it is to be appreciated that the communication highway 16 may include one or more sub-highways and/or may be coupled to another communication highway (not shown) associated with similar and/or different components.

In-coming jobs are handled by a plan generator 18, which interprets received jobs and creates the plans to process the jobs. Each job may include a description of one or more inputs, desired outputs, goals, attributes, parameters, variables, constraints, etc. The plan generator 18 may base the plans on any or all of these elements. A plan can be created to serially and/or concurrently process more than one job. In such instances, the plan may specify that portions of one or more jobs will be processed by similar and/or different components 12 and/or share paths within the communication highway 16. Upon confirming a plan (e.g., via a propose/accept/confirm protocol or other suitable plan validation technique), the plan is conveyed to the execution engine 14.

The execution engine 14 facilitates execution of plans. For instance, the execution engine 14 may send controls signals to one or more of the components 12. Such signals may provide instructions for processing the job(s), invoke warm-up routines, cycle power, activate diagnostics, reset hardware, include a query about the state of a component, etc. As depicted, the execution engine 14 can independently communicate with each of the components $12_1, 12_2, \ldots, 12_N$. Each of the components 12 can communicate with the execution engine 14. Thus, if the execution engine 14 prompts or queries one of the components 12 for information, the prompted or queried one of the components 12 can answer the execution engine 14. In addition, one or more of the components 12 can forward an exception, a message, an acknowledgment, a notification, etc. to the execution engine 14. The execution engine 14 may accept and/or reply to such information and/or ignore it.

Exceptions received by the planner 10 are handled via an exception handler 20. Upon receiving an exception, the exception handler 20 obtains a suitable algorithm from an algorithm bank 28. The suitable algorithm depends on the type of exception and user's preference and/or objective function. An example of a suitable algorithm includes, but is not limited to, the chained best first search algorithm. The planner 10 then creates one or more new plans on or off-line based on the error, the algorithm, user preferences, etc.

The following is an example of a non-limiting technique that can be used to create a new plan. All existing plans that have not been launched can be cancelled since they may not be valid or are no longer of good quality after the exception. If necessary, new goals can be created for in-flight portions of a plan. This can be achieved through various approaches such as those described in detail below, including discarding all partially processed product and restarting; only discarding product associated with the error (e.g., the component that threw the exception); discarding partially processed product that violate job integrity; discarding partially processed product that needs to be reproduced; and attempting to save as much partially processed product as possible. A re-planning time can be estimated based on the number of new plans that need to be re-planned. A margin can be added to this estimate to mitigate underestimating. The currently executing plans can be forward simulated according to the estimated re-plan time. Future failures caused by the forward simulation can be anticipated. New plans with new goals, starting from the forward simulation time, can be created. The planner 10 can then switch back to a normal planning mode and continue to run in the on-line mode.

Figure 3:
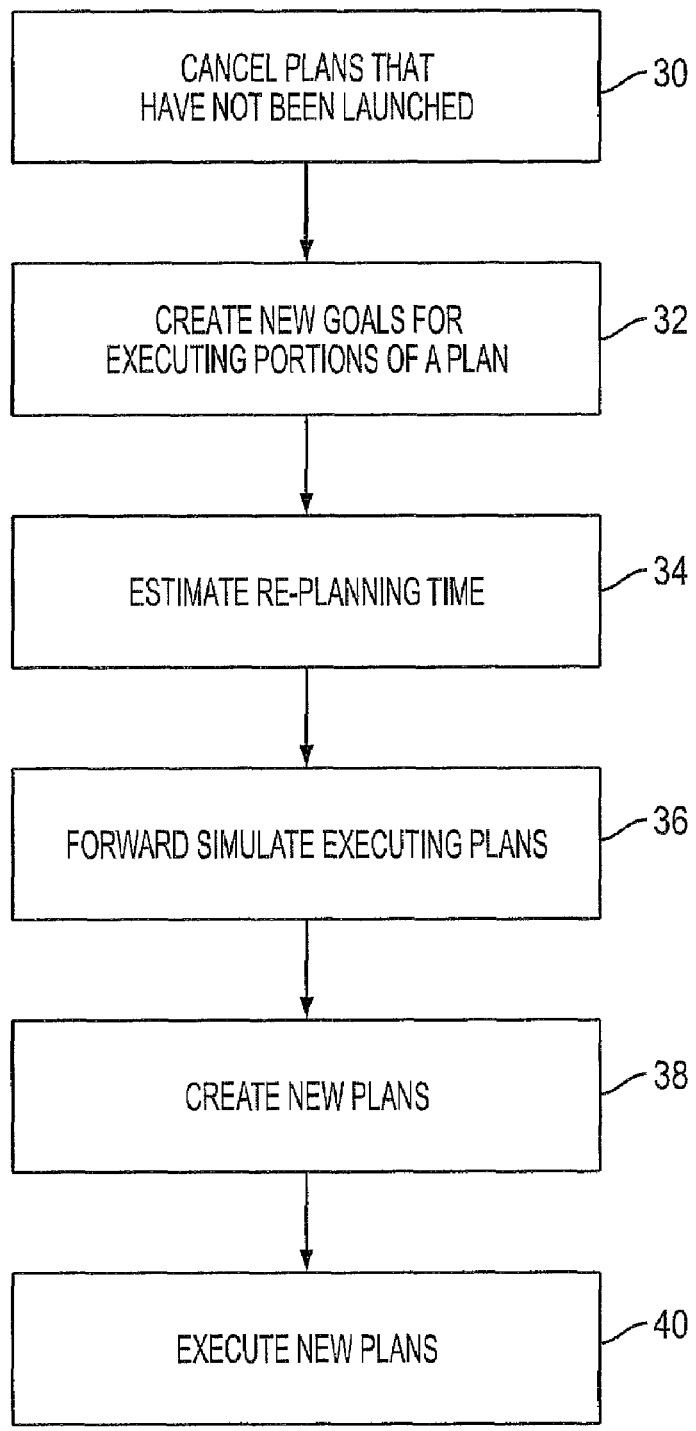
FIG. 3 illustrates a method for re-planning jobs upon execution failure of at least a portion of a plan.

FIG. 3 illustrates a method for re-planning jobs upon execution failure of at least a portion of a plan. Such failure may cause other plans to fail and/or not meet one or more goals of a user. At reference numeral 30, all plans that have not been launched are cancelled. At 32, new goals are created for executing portions of a plan, if necessary. Depending on the user preferences and/or system capabilities, this can be variously carried out. For example, in one approach, all executing portions of the plan(s) are terminated/purged and plan execution is restarted using the new plan. This approach generally consumes less time for re-planning and, thus, the system can be brought back up to a stable state relatively faster than the other techniques described herein. This may facilitate mitigating subsequent damage caused to the system by the original exception.

In another approach, only plans affected by the exception are terminated/purged and re-planned. Thus, plans for unrelated jobs will continue executing. With this plan, more time may be consumed during re-planning due to a harder re-planning problem in which the new plans should respect the previous plans that keep on executing; however, cost may be reduced by finishing executing unaffected plans. In another approach, portions of a plan affected by the exception continue to execute. This may entail leveraging system capabilities and using alternative means to complete executing portions of the plan. This approach will likely take longer time than the two previous approaches to handle exceptions but may provide greater value to the user. Other approaches are also contemplated. The particular approach used depends on goals, machine model before/after exception, exception types, user preferences, cost and benefits, inferences, probabilities, classifiers, etc.

At reference numeral 34, a re-planning time is estimated. This time is based on the number of new plans that will be created and the time it takes to create each new plan. At 36, currently executing plans are forward simulated based on the estimated re-planning time. The affect this will have on future failures is anticipated. At 38, new plans are created for the new goals starting from the forward simulation time. At 40, the newly created plans are executed.

FIGS. 4-7 illustrate exemplary implementations of the systems and methods described above. In this example, the system is a tightly integrate (multi-purpose) printing platform in which each printing job consists of multiple sheets that are to be printed in a particular order. The system can reject a given plan, turn on or off some capabilities due to user setting, or notify the planner 10 that a paper jam or other error has occurred in connection with a particular sheet. Although this example is discussed in terms of the printing platform, it is to be understood that any system that satisfies the following assumptions as well as other systems are suitable. The assumptions are that the system manipulates a batch of jobs that follow a certain order and the planner 10 may have to handle multiple batches at the same time by directing objects in different batches to separate output locations following the orders of jobs in each batch; and the system components 12 notify the planner 10 of the changes in their capabilities, for example, whether or not they can execute some capabilities at a given time if asked by the planner. As an example of an alternative system, each sheet of paper in this example can represent a more general manufacturing job and the different printing jobs (consists of many printing pages) can represent batch of jobs that need to be assembled at different locations. Other types of system are also contemplated.

Figure 4:
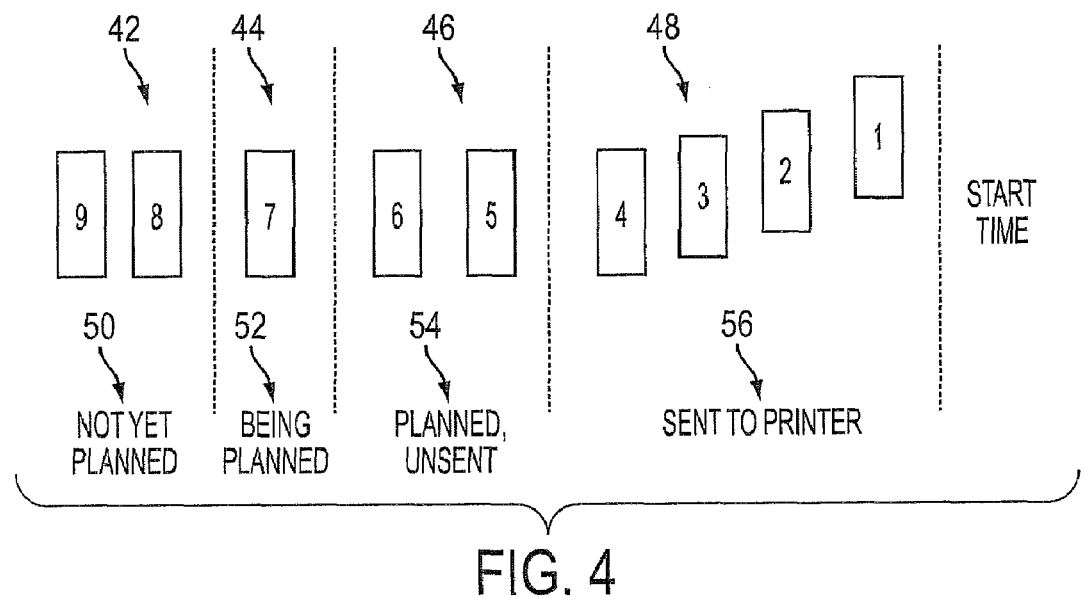
FIG. 4 illustrates a sequence of sheets that are serially handled by the planner.

Beginning with FIG. 4, a sequence of sheets that are serially handled by the planner 10 is illustrated. The sheets are delineated into four sets of sheets 42, 44, 46, and 48 belonging to different stages in the planning process. It is to be understood that more or less sets are also contemplated. Upon arriving at the planner 10, each job transitions through various states or queues. For example, a newly arrived and/or unplanned job may be considered to be in a "not yet planned" state as illustrated at 50; a job currently being planned may be considered to be in a "being planned" state as illustrated at 52; a planned job that has not yet been launched may be considered to be in a "planned, unsent" state as illustrated at 54, and a planned job that is sent to the printer may be considered to be in a "sent to printer" state as illustrated at 56.

Figure 5:
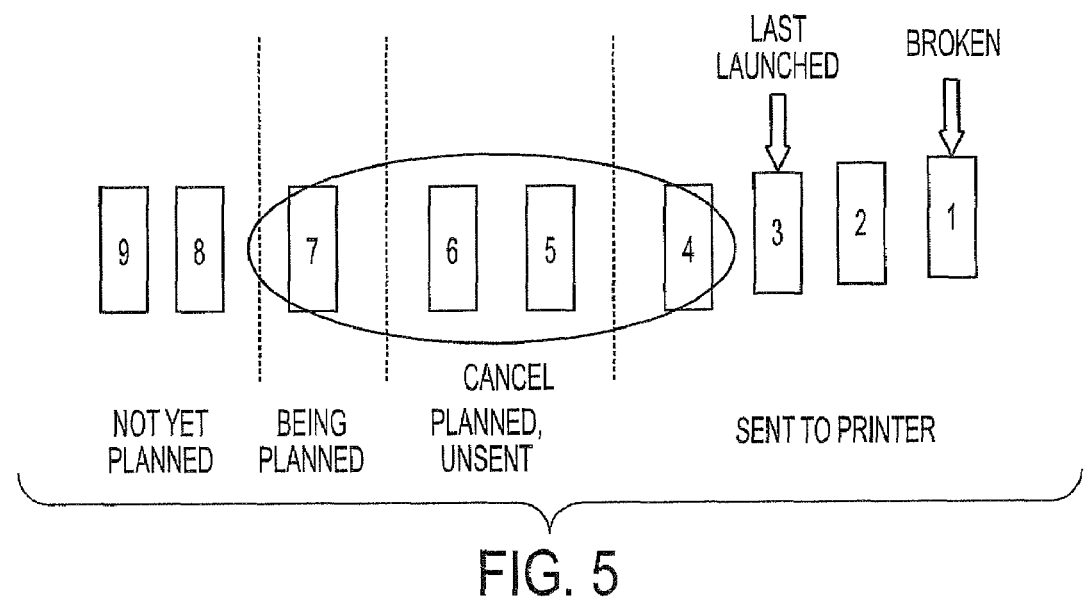
FIG. 5 illustrates an exemplary technique in which unlaunched sheets are cancelled because they may not be valid or are no longer of good quality due to the exception.

When an exception occurs, the planner 10 switches to a re-planning mode. The exception may be associated with the execution of a particular plan and may cause other plans associated with different jobs to fail and/or invalidate the goals of the user (e.g. a sheet may then go out to the finisher tray out of order). Using the method described in FIG. 3, all plans that have not been launched are cancelled. FIG. 5 shows that if sheet 3 is the last sheet launched, then plans for sheets 4-7 need to be cancelled because they may not be valid or are no longer of good quality after the machine model changed due to the exception. New goals are then created, if necessary, for in-flight sheets (e.g. send output sheets to a purge tray or shredder).

Then, depending on the number of new plans that will be created, a planning time by which a re-planning routine can reasonably be expected to complete is computed. The plans that are currently executing are forward simulated according to their current trajectories based on the computed re-planning time while anticipating future failures caused by this forward simulation. The planner 10 is then used to find plans for new goals starting from the forward simulated time together using various techniques. After re-planning, the planner 10 switches back to the normal planning mode and continues to run in the on-line mode. In the case illustrated in FIG. 5, one strategy is to purge sheets 2-3, and the planning mode can be restarted with all previous goals for sheets 1-9. If the exception causes an update to the status of some system component 12, the planner 10 will account for the changes via model-update messages so that the subsequent plans found in the re-planning and normal planning mode will not cause exactly the same exception again.

Figure 6:
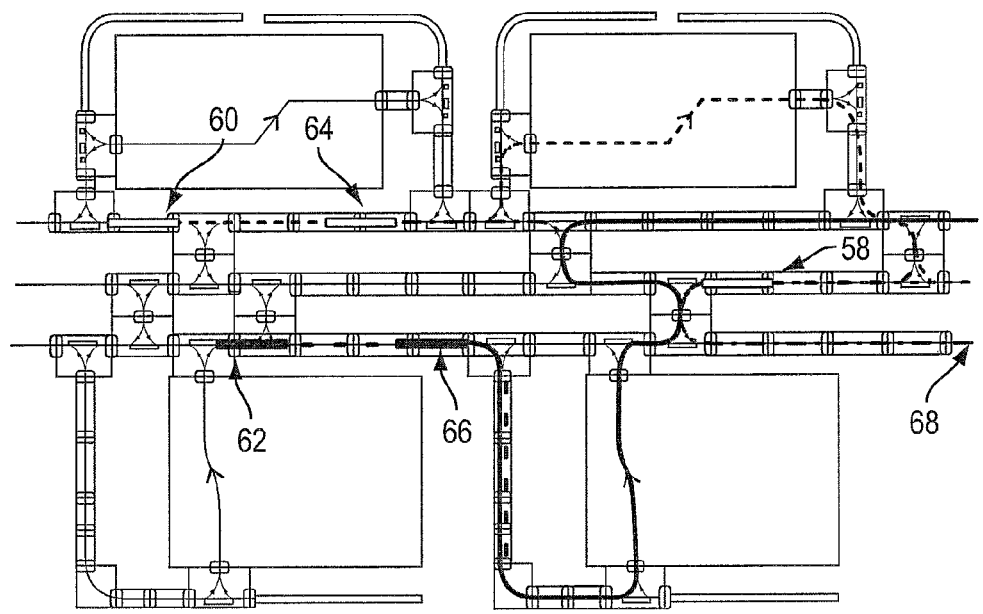
FIG. 6 illustrates exemplary techniques in which all sheets associated with executing plans or all sheets associated with a failed executing plan are purged.

For the case illustrated in FIG. 6, assume the sheet sequence as depicted in FIGS. 4 and 5 and an exception scenario in which the sheet 1 is jammed at 58 and a sheet 3 located at 60 is the last sheet launched. The jammed sheet 1 results in an exception in which sheets 4-7 in FIGS. 4 and 5 are canceled to prevent future exceptions. Sheet 2 located at 62 and sheet 3 are already in the system and need to be rerouted. Assume that sheet 2 belongs to the same job as jammed sheet 1 and sheet 3 belongs to a different job. Depending on the expected computation time to compute the new routes for sheets two and three, these sheets are forward simulated to new locations 64 and 66, respectively. The planner then begins to re-plan new routes for the sheets from the new locations 64 and 66. Depending on the user preferences and cost models, the planner 10 may choose one of the approaches describe above.

For example, the planner 10, depending on the user preferences and the cost models, may purge all sheets (i.e., sheets 2, and 3). For instance, if the media used for printing is inexpensive and the user does not care to save the sheets, the planner 10 can re-route them to a purge tray 68 or other device such as a shredder (not shown). With this approach, it does not matter whether an image is placed on a sheet of paper before routing it to the purge tray (or, in the general manufacturing domain, a part does not have to be calibrated before being purged). As a result, it generally takes less time to finish re-planning. Thus, the system can be brought back to a stable state faster, which can mitigate subsequent damage caused to the system by the original exception.

In another example, the planner 10, depending on the user preferences, may only purge sheets that are out-of-order. Thus, if the media used to print is rather costly and the user desires to save as many of them as possible while quickly finishing the re-planning process, then this approach can be used. For instance, routing sheet 2 to its original finisher tray will violate the integrity of its corresponding job (in which sheet 1 was broken). In this case, sheet 2 can be rerouted to the purge tray 64 while avoiding crashing into sheet one. For sheet 3, because it does not belong to the same job with the broken sheet, it can keep the same goal, be printed, and then be rerouted to its finisher tray while avoid crashing into sheet one (and also keep the job integrity of the its corresponding job if there are also other sheets belong to this job that also need to be rerouted). This approach will likely take more time than the above approach, but will save some media.

Figure 7:
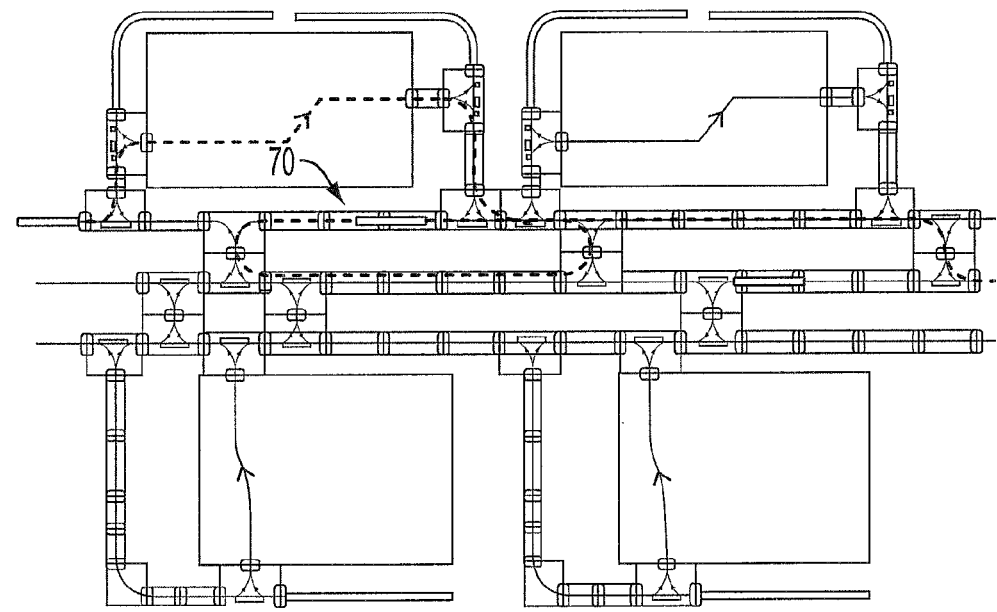
FIG. 7 illustrates an exemplary technique in which the system attempts to save sheets associated with a failed executing plan.

In another example, the planner 10, depending on the user preferences, the planner 10 may loop or park sheets while reproducing the broken sheets. This can be achieved in systems having multiple paths, including loops that can be leveraged to save even more media. This is illustrated in FIG. 7, which shows one example in which instead of re-routing out-of-order sheet 2 as in the previous approaches, it can be looped at 70 in the printer while waiting for the reprint of the broken sheet one finishes. Then, sheet 2 can b re-routed out of the loop and to a correct finisher tray. Instead of looping, if the system allows "parking" the sheet at some location while waiting for the reprint of broken sheet, then it can also be used as an alternative option to maximize the saving of printing media. This approach will likely take longer time than the previous approach to handle exceptions, but has the best chance of saving sheets.

As discussed previously, the particular approach used depends on whether saving unfinished sheets is more important than taking the shorter time to handle exception and reducing the chance of escalating the exception. The planner 10 and/or other components do not need to fix itself to a particular approach. Instead, it can follow a given preferred approach and switch to another if that approach is not possible or too costly. For example, to save media, the planner 10 can choose the third approach, but then if it does not find a loop or parking place in the system, it can switch to the second approach and/or the first approach.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system that re-plans jobs based at least in part on user preferences in response to system component errors, comprising:
   an exception handler that receives an exception from one of a plurality of components executing a plan to process a job; and
   a planner that creates a new plan for the job based at least in part on a model-based planning technique and at least one user preference and further creates new goals for currently executing portions of the plan operating in real-time, and wherein the new plan is forward simulated for an amount of time that depends on a number of plans that need to be re-built, the planner determining the new plan starting from a new location, of the system, for the new goals using a chained best first search algorithm, and wherein the new plan is sent to an execution engine to replace the plan which was the previous plan.

2. The system as set forth in claim 1, wherein the new plans are based on the new goals and include one of discarding all partially processed product; discarding all partially processed product corresponding to the component that threw the exception; discarding partially processed product that violate job integrity; and only discarding partially processed product that needs to be reproduced.

3. The system as set forth in claim 1, wherein the new plan is created on-line while the system continues to run.

4. The system as set forth in claim 1, wherein the new plan is further based on at least two of trade-offs between saving resources and exception handling time/effort, a state of the system, a cost model, the user's preferences, and the types of exceptions.

5. The system as set forth in claim 1, wherein the planner further creates one or more plans in order to process one or more jobs based on one or more capabilities of the plurality of components and one or more constraints on the one or more capabilities.

6. The system as set forth in claim 1, wherein the planner further handles batches of jobs that follow a particular order at substantially the same time.

7. The system as set forth in claim 1, wherein the new plan includes determining the new goals for currently executing portions of the plan according to real-time constraints and relations with a malfunctioning portion of the plan.

8. The system as set forth in claim 1, wherein the planner switches to a re-planning mode to create the new plan and returns to a normal mode to execute the new plan.

9. The system as set forth in claim 1, wherein the system is one of a printing platform, a manufacturing system, a packaging system, a logistic system, a routing system, a process, and an analysis system.

10. The system of claim 1, wherein the exception is one of a plurality of possible exceptions and use of the model-based planning technique and the at least one user preference mitigates a need to determine rules for all possible exceptions.

11. The system of claim 1, wherein the planner that creates the new plan uses an algorithm that corresponds to the at least one user preference.

12. The system of claim 11 wherein when the at least one user preference is to increase a speed at which a job is processed, the algorithm used by the planner is a time optimizing algorithm, and when the at least one user preference is to lower the cost of performing the job, the algorithm used by the planner is a cost optimizing algorithm.

13. A method for creating new plans for jobs based at least in part on user preferences in response to exceptions, comprising:

receiving an exception associated with a component implementing a plan;

cancelling all unlaunched plans;

creating new goals for currently executing portions of the plan operating in real-time that threw the exception, based at least in part on a user preference provided by a user;

forward simulating currently executing plans;

creating new plans for the new goals starting at the forward simulation time, wherein the new plan is forward simulated for an amount of time that depends on a number of plans that need to be re-built, the planner determining the new plan starting from a new location, of the system, for the new goals using a chained best first search algorithm, and wherein the new plan is sent to an execution engine to replace the plan which was the previous plan.

14. The method as set forth in claim 13, further including anticipating an affect the forward simulation will have on future failures.

15. The method as set forth in claim 13, further including creating the new goals based on one of the following approaches: purging executing portions of executing plans; only purging executing portions of plans associated with the exception; and only purging executing portions that are rebuilt.

16. The method as set forth in claim 15, further including selecting the approach based on at least one of a user preference, a goal, a system model, a type of exception, a cost, a benefit, an inference, a probability, a classifier.

17. The method as set forth in claim 13, further including:
estimating a re-planning time based on a number of new plans that will be created and a time it takes to create each new plan; and basing the forward simulation on the estimated re-planning time.

18. The method as set forth in claim 13, further including executing the new plan to process the job.

19. A xerographic system that re-plans jobs based at least in part on user preferences in response to exceptions, comprising:

an exception handler, of the xerographic system, that receives an exception from one of a plurality of components executing a plan to process a job;

a planner, of the xerographic system, that creates a new plan for the job based at least in part on a model-based planning technique and at least one user preference provided by a user and further creates new goals for currently executing portions of the plan operating in real-time, and wherein the new plan is forward simulated for an amount of time that depends on a number of plans that need to be re-built, the planner determining the new plan starting from a new location, of the system, for the new goals using a chained best first search algorithm; and an execution engine, of the xerographic system, that executes the new plan, wherein the new plan is sent to the execution engine to replace the plan which was the previous plan.

20. The xerographic system as set forth in claim 19, wherein the plan is forward simulated for an amount of time that depends on a number of plans that need to be re-built and the new plan is created based on the forward simulated time.

21. The xerographic system as set forth in claim 19, wherein the planner anticipates an affect the forward simulation to mitigate potential future exceptions.

* * * * *